(12) United States Patent
Miyauchi et al.

(10) Patent No.: US 12,209,205 B2
(45) Date of Patent: Jan. 28, 2025

(54) LAMINATE ADHESIVE

(71) Applicant: MITSUI CHEMICALS, INC., Tokyo (JP)

(72) Inventors: Yuta Miyauchi, Ichihara (JP); Kazuhiro Ando, Chiba (JP)

(73) Assignee: Mitsui Chemicals, Inc., Tokyo (JP)

( * ) Notice: Subject to any disclaimer, the term of this patent is extended or adjusted under 35 U.S.C. 154(b) by 1019 days.

(21) Appl. No.: 17/256,519

(22) PCT Filed: Jul. 8, 2019

(86) PCT No.: PCT/JP2019/026992
§ 371 (c)(1),
(2) Date: Dec. 28, 2020

(87) PCT Pub. No.: WO2020/013129
PCT Pub. Date: Jan. 16, 2020

(65) Prior Publication Data
US 2021/0179902 A1    Jun. 17, 2021

(30) Foreign Application Priority Data
Jul. 11, 2018    (JP) .................. 2018-131270

(51) Int. Cl.
| C08G 18/68 | (2006.01) |
| B32B 7/12 | (2006.01) |
| C08G 18/10 | (2006.01) |
| C08G 18/24 | (2006.01) |
| C08G 18/76 | (2006.01) |
| C08G 18/79 | (2006.01) |
| C08G 63/183 | (2006.01) |
| C09J 175/06 | (2006.01) |

(52) U.S. Cl.
CPC .............. *C09J 175/06* (2013.01); *B32B 7/12* (2013.01); *C08G 18/10* (2013.01); *C08G 18/244* (2013.01); *C08G 18/68* (2013.01); *C08G 18/7642* (2013.01); *C08G 18/791* (2013.01); *C08G 63/183* (2013.01); *C08G 2170/00* (2013.01)

(58) Field of Classification Search
CPC ........ C09J 175/06; B32B 7/12; B32B 15/085; B32B 15/088; B32B 15/20; B32B 27/08; B32B 27/304; B32B 27/32; B32B 27/36; B32B 2250/04; B32B 2255/20; B32B 2255/205; B32B 2307/732; B32B 2307/748; B32B 2439/70; B32B 2439/80; B32B 15/18; B32B 27/16; B32B 27/34; C08G 18/10; C08G 18/244; C08G 18/68; C08G 18/7642; C08G 18/791; C08G 63/183; C08G 2170/00; C08G 18/4288; C08G 18/683; C08G 18/755; C08G 18/792; C08G 18/794; C08G 18/8029; C08G 18/4216

See application file for complete search history.

(56) References Cited

U.S. PATENT DOCUMENTS

| 2010/0249360 A1 | 9/2010 | Imai et al. |
| 2017/0066949 A1 | 3/2017 | Imai et al. |
| 2017/0355891 A1 | 12/2017 | Natsumoto et al. |
| 2019/0300766 A1* | 10/2019 | Pardal .................. C09J 175/08 |
| 2021/0032517 A1* | 2/2021 | Muller-Sellak .... C08G 18/4238 |

FOREIGN PATENT DOCUMENTS

| JP | 2011-102387 A | 5/2011 |
| JP | 2014-19711 A | 2/2014 |
| JP | 2014-58685 A | 4/2014 |
| WO | 2009/072431 A1 | 6/2009 |
| WO | 2015/133496 A1 | 9/2015 |
| WO | 2016/104510 A1 | 6/2016 |

OTHER PUBLICATIONS

International Search Report (ISR) dated Aug. 6, 2019 filed in PCT/JP2019/026992.
PCT International Preliminary Report On Patentability (Form PCT/IB/373) filed in PCT/JP2019/026992 with PCT Notification Concerning Transmittal of International Preliminary Report on Patentability (Form PCT/IB/326) dated Aug. 6, 2019.
PCT International Preliminary Report on Patentabilibty (Form PCT/IB/373) filed in PCT/JP2019/026992 with PCT Notification of Transmittal of Translation of the International Preliminary Report on Patentability (Form PCT/IB/338) dated Aug. 6, 2019.

* cited by examiner

*Primary Examiner* — Kumar R Bhushan
(74) *Attorney, Agent, or Firm* — RANKIN, HILL & CLARK LLP

(57) ABSTRACT

The laminate adhesive contains a polyisocyanate component and a polyol component. The polyol component contains polyurethane polyol of a reaction product of polyol and a polyisocyanate derivative with an average functional group of more than 2. The polyisocyanate derivative is an araliphatic diisocyanate derivative and/or alicyclic diisocyanate derivative.

7 Claims, No Drawings

LAMINATE ADHESIVE

TECHNICAL FIELD

The present invention relates to a laminate adhesive, to be specific, a laminate adhesive used for laminate processing of a laminate film.

BACKGROUND ART

As a wrapping material used in various industrial fields, a laminate film has been known. To be specific, a laminate film produced by laminate processing, for example, a plastic film, metal foil such as aluminum, a metal deposited film, and a silica deposited film with an adhesive has been known.

For the adhesive used for such laminate films, a two-component curable polyurethane adhesive, that is, a two-component curable polyurethane adhesive used by combining a curing agent including a polyisocyanate component and a main component including a polyol component is known.

To be more specific, for example, Patent Document 1 has proposed a laminate film including a laminate adhesive and a plurality of films that are allowed to adhere to each other with the laminate adhesive: the laminate adhesive contains a main component containing polyurethane polyol produced by reaction of polyol and 3-isocyanatomethyl-3,5,5-trimethyl cyclohexyl isocyanate (IPDI), and a curing agent containing an isocyanurate derivative of xylylene diisocyanate, and they are aged at 24° C. for 4 days (for example, see Patent Document 1).

CITATION LIST

Patent Document

[Patent Document 1] WO2015/133496

SUMMARY OF THE INVENTION

Problem to be Solved by the Invention

Meanwhile, in the production of a laminate film, when a laminate adhesive that requires aging for 4 days or more is used, there are disadvantages in that production of a laminate film takes longer time.

The present invention provides a laminate adhesive, with which delamination at the time of heating can be suppressed even if the aging time is short.

Means for Solving the Problem

The present invention [1] includes a laminate adhesive containing a polyisocyanate component and a polyol component, wherein the polyol component contains polyurethane polyol of a reaction product of polyol and a polyisocyanate derivative with an average functional group of more than 2, and the polyisocyanate derivative is an araliphatic diisocyanate derivative and/or alicyclic diisocyanate derivative.

The present invention [2] includes the laminate adhesive described in [1] above, wherein the polyisocyanate derivative is an isocyanurate derivative of araliphatic diisocyanate and/or isocyanurate derivative of alicyclic diisocyanate.

The present invention [3] includes the laminate adhesive described in [1] or [2] above, wherein the polyisocyanate derivative is an isocyanurate derivative of 3-isocyanatomethyl-3,5,5-trimethyl cyclohexyl isocyanate.

The present invention [4] includes a laminate adhesive described in any one of the above-described [1] to [3], wherein the polyisocyanate component contains an isocyanurate derivative of xylylene diisocyanate and/or triol derivative of xylylene diisocyanate.

The present invention [5] includes a laminate adhesive described in any one of the above-described [1] to [4], wherein the polyisocyanate component contains an isocyanurate derivative of xylylene diisocyanate and a triol derivative of xylylene diisocyanate.

The present invention [6] includes the laminate adhesive described in [5] above, wherein the ratio of the content of the triol derivative of xylylene diisocyanate relative to the content of the isocyanurate derivative of xylylene diisocyanate is 1.5 or more and 4 or less.

The present invention [7] includes the laminate adhesive described in any one of the above-described [1] to [6], wherein the polyol is a reaction product of a low molecular-weight polyol and polybasic acid, and the polybasic acid contains dimer acid.

Effects of the Invention

The laminate adhesive of the present invention contains a polyisocyanate component and a polyol component, the polyol component contains polyurethane polyol of a reaction product of polyol and a polyisocyanate derivative with an average functional group of more than 2, and the polyisocyanate derivative is an araliphatic diisocyanate derivative and/or alicyclic, diisocyanate derivative. Therefore, delamination at the time of heating can be suppressed even if the aging time of the laminate adhesive is short.

DESCRIPTION OF EMBODIMENTS

The laminate adhesive of the present invention contains a polyisocyanate component and a polyol component, preferably, the laminate adhesive of the present invention is composed of a polyisocyanate component and a polyol component.

The polyisocyanate component is a curing agent for the polyol component (main component) to be described later, and for example, a polyisocyanate monomer and a polyisocyanate derivative are used.

Examples of the polyisocyanate monomer include polyisocyanate monomers such as aromatic polyisocyanate, &aliphatic polyisocyanate, aliphatic polyisocyanate, and alicyclic polyisocyanate.

For the aromatic polyisocyanate, for example, aromatic diisocyanates such as tolylene diisocyanate (2,4- or 2,6-tolylene diisocyanate or a mixture thereof) (TDI), phenylene diisocyanate (m-, p-phenylene diisocyanate or a mixture thereof). 4,4'-diphenyl diisocyanate, 1,5-naphthalene diisocyanate (NDI), diphenyl methane diisocyanate (4,4'-,2,4'- or 2,2'-diphenyl methane diisocyanate or a mixture thereof) (MDI), 4,4'-toluidine diisocyanate (TODI), and 4,4'-diphenyl ether diisocyanate are used.

For the araliphatic polyisocyanate, for example, araliphatic diisocyanates such as xylylene diisocyanate (1,3- or 1,4-xylylene diisocyanate or a mixture thereof) (XDI), tetra methyl xylylene diisocyanate (1,3- or 1,4-tetra methyl xylylene diisocyanate or a mixture thereof) (TMXDI), and ω,ω'-diisocyanate-1,4-diethyl benzene.

For the aliphatic polyisocyanate, for example, aliphatic diisocyanates such as trimethylene diisocyanate, 1,2-propylene diisocyanate, butylene diisocyanate (tetra methylene diisocyanate, 1,2-butylene diisocyanate, 2,3-butylene diisocyanate, 1,3-butylene diisocyanate), 1,5-pentamethylene diisocyanate (PDI), 1,6-hexamethylene diisocyanate (HDI), 2,4,4- or 2,2,4-trimethyl hexamethylene diisocyanate, and 2,6-diisocyanate methyl caproate are used.

For the alicyclic polyisocyanate, for example, alicyclic diisocyanates such as hydrogenated xylylene diisocyanate (1,2-hydrogenated xylylene diisocyanate, 1,3-hydrogenated xylylene diisocyanate, 1,4-hydrogenated xylylene diisocyanate), 1,3-cyclo pentane diisocyanate, 1,3-cyclopentene diisocyanate, cyclohexane diisocyanate (1,4-cyclohexane diisocyanate, 1,3-cyclohexane diisocyanate), 3-isocyanatomethyl-3,5,5-trimethyl cyclohexyl isocyanate (isophorone diisocyanate) (IPDI), methylene bis(cyclohexyl isocyanate) (4,4'-, 2,4'- or 2,2'-methylene bis(cyclohexyl isocyanate, Trans,Trans-isomer, Trans,Cis-isomer, or Cis, Cis-isomer of these, or a mixture thereof)) ($H_{12}MDI$), methyl cyclohexane diisocyanate (methyl-2,4-cyclohexane diisocyanate, methyl-2,6-cyclohexane diisocyanate), and norbornane diisocyanate (various isomers or a mixture thereof) (NBDI) are used.

These polyisocyanate monomers may be used singly, or can be used in combination of two or more.

Examples of the polyisocyanate derivative include multimers (for example, dimers, trimers (for example, isocyanurate derivative, iminooxadiazine dione derivative), pentamers, heptamers, etc.), allophanate derivatives (for example, allophanate derivative produced by reaction of the above-described polyisocyanate monomer with a known low molecular-weight polyol, etc.), polyol derivatives (for example, triol derivative produced by reaction of the above-described polyisocyanate monomer with a known triol (preferably, trimethylolpropane)), etc.), biuret derivatives (for example, biuret derivative produced by reaction of the above-described polyisocyanate monomer with water or amines, etc.), urea derivatives (for example, urea derivative produced by the above-described polyisocyanate monomer with diamine, etc.), oxadiazinetrione derivatives (for example, oxadiazinetrione produced by reaction of the above-described polyisocyanate monomer with carbon dioxide, etc.), carbodiimide derivatives (carbodiimide derivative produced by decarboxylation condensation reaction of the above-described polyisocyanate monomer, etc.), uretdione derivatives, and uretonimine derivatives of the above-described polyisocyanate monomer. Furthermore, for the polyisocyanate derivative, polymethylene poly phenyl polyisocyanate (crude MDI, polymeric MDI) is also used.

These polyisocyanate derivatives may be used singly, or can be used in combination of two or more.

The polyisocyanate component preferably contains a polyisocyanate derivative, more preferably, contains a polyisocyanate derivative of araliphatic polyisocyanate, even more preferably, a polyisocyanate derivative of xylylene diisocyanate.

The polyisocyanate component preferably contains a multimer of polyisocyanate monomers and/or a polyol derivative of polyisocyanate monomers, more preferably, contains an isocyanurate derivative of polyisocyanate monomers and/or a triol derivative of polyisocyanate monomers.

Particularly preferably, the polyisocyanate component contains an isocyanurate derivative of xylylene diisocyanate and/or triol derivative of xylylene diisocyanate.

When the polyisocyanate component contains the isocyanurate derivative of xylylene diisocyanate and/or triol derivative of xylylene diisocyanate, delamination at the time of heating can be suppressed, and excellent adhesive strength can be achieved.

Particularly preferably, the polyisocyanate component contains an isocyanurate derivative of xylylene diisocyanate.

When the polyisocyanate component contains the isocyanurate derivative of xylylene diisocyanate, delamination at the time of heating can be suppressed, and appearance after retorting and heat seal strength are excellent.

Most preferably, the polyisocyanate component contains an isocyanurate derivative of xylylene diisocyanate and a triol derivative of xylylene diisocyanate.

When the polyisocyanate component contains an isocyanurate derivative of xylylene diisocyanate and a triol derivative of xylylene diisocyanate, delamination at the time of heating can be suppressed, and appearance after retorting and heat seal strength, and excellent adhesive strength can be achieved.

When the polyisocyanate component contains an isocyanurate derivative of xylylene diisocyanate and a triol derivative of xylylene diisocyanate, the ratio of the content of the triol derivative of xylylene diisocyanate relative to the content of the isocyanurate derivative of xylylene diisocyanate is, for example, 0.5 or more, preferably 1.5 or more, more preferably 2.0 or more, and for example, 10.0 or less, preferably 4.0 or less, more preferably 3.0 or less.

When the above-described ratio is the above-described lower limit or more, excellent adhesive strength after retorting can be achieved.

When the above-described ratio is the above-described upper limit or less, appearance after retorting and heat seal strength are excellent.

The polyisocyanate component can be diluted with an organic solvent.

Examples of the organic solvent include ketones such as acetone, methyl ethyl ketone, and cyclohexanone; nitriles such as acetonitrile; alkyl esters such as methyl acetate, ethyl acetate, butyl acetate, and isobutyl acetate; aliphatic hydrocarbons such as n-hexane, n-heptane, and octane; alicyclic hydrocarbons such as cyclohexane and methyl cyclohexane; aromatic hydrocarbons such as toluene, xylene, and ethyl benzenes; glycol ether esters such as methyl cellosolve acetate, ethyl cellosolve acetate, and methyl carbitol acetate; ethers such as diethyl ether, tetrahydrofuran, and dioxane; halogenated aliphatic hydrocarbons such as methyl chloride, methylene chloride, chloroform, carbon tetrachloride, and dichloro ethane; and polar aprotic solvents such as N-methylpyrrolidone, dimethylformamide, N,N'-dimethylacetamide, and dimethyl sulfoxide.

These organic solvents may be used singly, or can be used in combination of two or more.

For the organic solvent, preferably, alkyl esters, even more preferably, ethyl acetate is used.

When the polyisocyanate component is diluted with an organic solvent, the solid content concentration of the polyisocyanate component is, for example, 30 mass % or more, preferably 50 mass % or more, and for example, 90 mass % or less, preferably 80 mass % or less. The polyisocyanate component can be used without dilution with an organic solvent, that is, with a solid content concentration of 100 mass %.

The polyol component is the main component of the above-described polyisocyanate component, and contains polyurethane polyol as an essential component.

Polyurethane polyol is a reaction product of polyol and a polyisocyanate derivative with an average functional group of more than 2.

For the polyol, for example, a high molecular weight polyol is used.

The high molecular weight polyol is a compound having two or more hydroxyl groups and having a number average molecular weight of 400 or more, preferably 500 or more, and for example, polyether polyol, polyester polyol, and polycarbonate polyol are used, and preferably, polyester polyol is used.

For the polyether polyol, for example, polyoxy alkylene polyol, polyoxytetramethylene ether glycol, and polyoxy trimethylene ether glycol are used.

For the polyoxy alkylene polyol, for example, the following is used: an addition polymerization product (including random and/or block copolymer of two or more alkylene oxides) of alkylene oxides such as ethylene oxide and propylene oxide using an initiator of, for example, a low molecular-weight polyol to be described later or aromatic/aliphatic polyamine.

For the polyoxytetramethylene ether glycol, for example, the following is used: a ring-opening polymerization product produced by cationic polymerization of tetrahydrofuran, and noncrystalline polyoxytetramethylene ether glycol produced by copolymerization of a polymerization unit of tetrahydrofuran with dihydric alcohol to be described later.

Furthermore, plant-derived polyoxytetramethylene ether glycol using tetrahydrofuran as a starting material produced by using a plant-derived material such as furfural can also be used.

For the polyoxy trimethylene ether glycol, for example, polyol produced by condensation polymerization of a plant-derived 1,3-propanediol is used.

For the polyester polyol, a reaction product (polycondensation polyester polyol) of polycondensation of a low molecular-weight polyol (polyhydric alcohol) and polybasic acid is used.

The low molecular-weight polyol is a compound having two or more hydroxyl groups and an average molecular weight of 40 or more and less than 400, preferably 300 or less, and examples thereof include dihydric alcohols (for example, ethylene glycol, propylene glycol, 1,3-propanediol, 1,4-butylene glycol, 1,5-pentanediol, 1,6-hexanediol, neopentyl glycol, cyclohexanediol, hydrogenated bisphenol A, bisphenol A, diethylene glycol, triethylene glycol, etc.), trihydric alcohols (for example, glycerine, trimethylolpropane, tri isopropanol amine, etc.), tetrahydric alcohols (for example, tetra methylol methane (pentaerythritol), diglycerol, etc.), pentahydric alcohols (for example, xylitol, etc.), hexahydric alcohols (for example, sorbitol, mannitol, allitol, iditol, dulcitol, altritol, inositol, dipentaerythritol, etc.), and heptahydric alcohols (for example, perseitol, etc.), and octahydric alcohol (for example, sucrose, etc.).

These low molecular-weight polyols may be used singly or in combination of two or more.

For the low molecular-weight polyol, preferably, a dihydric alcohol (tow molecular-weight diol) is used, even more preferably, two or more dihydric alcohols (low molecular-weight diol) are used, particularly preferably, at least one selected from the group consisting of ethylene glycol, neopentyl glycol, and 1,6-hexanediol is used, and most preferably, ethylene glycol, neopentyl glycol, and 1,6-hexanediol are used in combination.

Examples of the polybasic acid include saturated aliphatic dicarboxylic acids such as, for example, oxalic acid, malonic acid, succinic acid, methyl succinic acid, glutaric acid, adipic acid, 1,1-dimethyl-1,3-dicarboxy propane, 3-methyl-3-ethyl glutaric acid, azelaic acid, and sebacic acid; unsaturated aliphatic dicarboxylic acid such as, for example, maleic acid, fumaric acid, and itaconic acid; aromatic dicarboxylic acid such as, for example, orthophthalic acid, isophthalic acid, terephthalic acid, toluene dicarboxylic acid, and naphthalene dicarboxylic acid; alicyclic dicarboxylic acids such as, for example, hexahydrophthalic acid; other carboxylic acids, and acid anhydrides derived from these carboxylic acids such as, for example, dimer acid, hydrogenated dimer acid, and het acid (for example, oxalic anhydride, succinic anhydride, maleic anhydride, phthalic anhydride, 2-alkyl (C12 to C18) succinic anhydride, tetrahydrophtalic anhydride, trimellitic anhydride), and acid halides derived from these carboxylic acids (for example, oxalic acid dichloride, adipic acid dichloride, sebacic acid dichloride).

The polybasic acid preferably contains at least saturated aliphatic dicarboxylic acid (preferably, adipic acid) and aromatic dicarboxylic acid (preferably, isophthalic acid, terephthalic acid), and more preferably, furthermore, other carboxylic acids (preferably, dimer acid).

That is, more preferably, polybasic acid contains dimer acid.

When the polybasic acid contains dimer acid, strength under heat is excellent, and heat seal strength and adhesion performance after retorting are excellent.

To allow reaction between the polybasic acid and low molecular-weight polyol, the polybasic acid is blended with the low molecular-weight polyol so that the equivalent ratio of the hydroxyl group of low molecular-weight polyol relative to the carboxyl group of polybasic acid (hydroxyl group/carboxyl group) is, for example, more than 1 and 2 or less, and as necessary, an esterification catalyst is added to cause esterification reaction between polybasic acid and low molecular-weight polyol.

For the esterification catalyst, a known esterification catalyst such as the following is used: organic titanium compounds such as, for example, tetra methyl titanate and tetra butyl titanate; organic tin compounds such as, for example, dibutyl tin oxide; acetic acid metal salts such as, for example, zinc acetate, manganese acetate, and calcium acetate.

These esterification catalysts may be used singly, or can be used in combination of two or more.

For the esterification catalyst, preferably, acetic acid metal salt, more preferably, zinc acetate is used.

The esterification catalyst is added in an amount of, relative to 100 parts by mass of polybasic acid, for example, 0.001 parts by mass or more, preferably 0.01 parts by mass or more, and for example, 0.5 parts by mass or less, preferably 0.1 parts by mass or less.

The esterification reaction is conducted under reaction conditions of the following: the temperature is, for example, 150° C. or more and 250° C. or less, and the time is, for example, 8 hours or more and 96 hours or less. The esterification reaction is conducted preferably under inert gas atmosphere (for example, nitrogen, argon, etc.).

In this manner, the polybasic acid and low molecular-weight polyol are subjected to esterification reaction, thereby preparing polyester polyol. Polyester polyol can also be prepared by a known transesterification of alkyl ester of the above-described polybasic acid and the above-described low molecular-weight polyol.

Examples of the polyester polyol include plant derived polyester polyols obtained by condensation reaction of hydroxycarboxylic acid such as hydroxyl group-containing vegetable oil fatty acid (e.g., castor oil fatty acid containing ricinoleic acid, hydrogenated castor oil fatty acid containing 12-hydroxystearic acid, etc.) using the above-described low-molecular-weight polyol under known conditions.

Examples of the polyester polyol include polycaprolactone polyol and polyvalerolactone polyol obtained by ring-opening polymerization of lactones such as ε-caprolactone, γ-valerolactone, etc. using the above-described low-molecular-weight polyols (preferably, dihydric alcohol) as an initiator; and further lactone-based polyester polyols obtained by copolymerizing such a polycaprolactone polyol or polyvalerolactone polyol with the above-described dihydric alcohol.

For the polyester polyol, preferably, polycondensation polyester polyol is used.

The polyester polyol has a viscosity at 150° C. of, for example, 100 mPa·s or more, preferably 1000 mPa·s or more, and for example, 10000 mPa·s or less, preferably 8000 mPa·s or less, more preferably 7000 mPa·s or less, even more preferably 6500 mPa·s or less.

The viscosity can be determined with a cone plate viscometer in accordance with JIS K 7117-2 (1999) (the same applies in the following).

For the polycarbonate polyol, the following is used: a ring-opening polymerization product of ethylene carbonate using the above-described low molecular-weight polyol (preferably, dihydric alcohol) as an initiator, and noncrystalline polycarbonate polyol produced by copolymerizing dihydric alcohols such as, for example, 1,4-butanediol, 1,5-pentanediol, 3-methyl-1,5-pentanediol, and 1,6-hexanediol, and a ring-opening polymerization product.

The above-described polyol can be modified with acid as necessary.

The polyol can be modified by acid by any method without particular limitation, and a known method is used. To be specific, for example, terminal hydroxyl group of polyol is allowed to react with, for example, acid anhydride such as trimellitic anhydride, phthalic anhydride, maleic anhydride, and pyromellitic anhydride, at a ratio such that the equivalent ratio (acid anhydride/hydroxyl group) of the acid anhydride relative to the terminal hydroxyl group of polyol is, for example, 0.1 or more and 1.0 or less. The reaction conditions are suitably set in accordance with the types of polyol and the types of acid anhydride.

For the polyisocyanate derivative with an average functional group of more than 2, of the above-described polyisocyanate derivatives, a polyisocyanate derivative having an average functional group of more than 2, preferably 2.5 or more, more preferably 3 or more, and for example, 5 or less, preferably 4 or less is used. The polyisocyanate derivative with an average functional group of more than 2 has an isocyanate group as a functional group.

The polyisocyanate derivative with an average functional group of more than 2 is an araliphatic diisocyanate derivative and/or alicyclic diisocyanate derivative.

The polyisocyanate derivative with an average functional group of more than 2 is an araliphatic, diisocyanate derivative and/or alicyclic diisocyanate derivative, and therefore delamination at the time of heating can be suppressed, and heat seal strength and adhesion performance after retorting are excellent.

Preferably, for the polyisocyanate derivative with an average functional group of more than 2, xylylene diisocyanate (XDI) derivative, 3-isocyanatomethyl-3,5,5-trimethyl cyclohexyl isocyanate (IPM) derivative, even more preferably, 3-isocyanatomethyl-3,5,5-trimethyl cyclohexyl isocyanate (IPDI) derivative are used.

When the polyisocyanate derivative with an average functional group of more than 2 is 3-isocyanatomethyl-3,5,5-trimethyl cyclohexyl isocyanate (IPDI) derivative, heat seal strength and adhesion performance after retorting are even better.

Preferably, for the polyisocyanate derivative with an average functional group of more than 2, an isocyanurate derivative and a triol derivative are used, more preferably, an isocyanurate derivative (to be specific, isocyanurate derivative of araliphatic diisocyanate and isocyanurate derivative of alicyclic diisocyanate) is used.

When the polyisocyanate derivative with an average functional group of more than 2 is an isocyanurate derivative, delamination at the time of heating can be suppressed, and appearance after retorting is excellent.

Particularly preferably, for the polyisocyanate derivative with an average functional group of more than 2, an isocyanurate derivative of 3-isocyanatomethyl-3,5,5-trimethyl cyclohexyl isocyanate (IPDI) is used.

When the polyisocyanate derivative with an average functional group of more than 2 is an isocyanurate derivative of 3-isocyanatomethyl-3,5,5-trimethyl cyclohexyl isocyanate (IPDI), delamination at the time of heating can be suppressed, and adhesion performance after retorting can be even better.

To produce polyurethane polyol, polyol is blended with a polyisocyanate derivative with an average functional group of more than 2 at the equivalent ratio (OH/NCO) of the hydroxyl group relative to the isocyanate group of, for example, more than 1, and as necessary, a urethane-forming catalyst is added, and the polyol and polyisocyanate derivative with an average functional group of more than 2 are subjected to urethane-forming reaction.

For the urethane-forming catalyst, for example, a known urethane-forming catalyst such as amines and organometallic compounds are used.

For the amines, for example, tertiary amines (for example, triethyl amine, triethylenediamine, bis-(2-dimethyl amino ethyl) ether, etc.), quaternary ammonium salt (for example, tetra ethyl hydroxyl ammonium, etc.), imidazoles (for example, imidazole, 2-ethyl-4-methyl imidazole, etc.) are used.

Examples of the organometallic compound include organic tin compounds such as tin acetate, tin octylate, tin oleate, and tin laurate; organic lead compounds such as lead octoate and lead naphthenate; organic nickel compounds such as nickel naphthenate; organic cobalt compounds such as cobalt naphthenate; organic copper compounds such as octenoic acid copper; organic bismuth compound; organic zirconium compound; organic titanium compound; and organic zinc compound.

These urethane-forming catalysts may be used singly or in combination of two or more.

For the urethane-forming catalyst, preferably, an organic tin compound, even more preferably, tin octylate is used. The urethane-forming catalyst is added in an amount of, relative to 100 parts by mass of the polyisocyanate derivative with an average functional group of more than 2, for example, 0.001 parts by mass or more, preferably 0.05 parts by mass or more, and for example, 2 parts by mass or less, preferably 1 part by mass or less.

The urethane-forming reaction is conducted under the reaction conditions of the following: a temperature of, for example, 40° C. or more and 100° C. or less, and the time is, for example, 2 hours or more and 24 hours or less. The urethane-forming reaction is conducted, preferably under inert gas atmosphere (for example, nitrogen, argon, etc.).

In this manner, the polyol and polyisocyanate derivative with an average functional group of more than 2 are subjected to urethane-forming reaction, and polyurethane polyol having a hydroxyl group at its terminal is prepared.

The thus produced polyurethane polyol has a number average molecular weight (polystyrene standard calibration) of, for example, 3000 or more, preferably 5000 or more, and for example, 10000 or less.

The polyol component generally has an acid number of, 0 mgKOH/g or more, and for example, 280 mgKOH/g or less, preferably, 100 mgKOH/g or less, more preferably, 50 mgKOH/g.

The polyol component can be diluted with the above-described organic solvent (preferably, ethyl acetate).

When the polyol component is diluted with an organic solvent, the polyol component has a solid content concentration of, for example, 10 mass % or more, preferably 30 mass % or more, and for example, 95 mass % or less, preferably 90 mass % or less. The polyol component can be used with a solid content concentration of 100 mass %, that is, without being diluted with an organic solvent.

The laminate adhesive can contain known additives such as, for example, a silane coupling agent such as amino silane and epoxy silane, a compound containing a sulfonamide group, oxyacid of phosphorus or a derivative thereof, furthermore, epoxy resin, catalyst, carboxylic acid or an anhydride thereof, antioxidant, ultraviolet absorber, hydrolysis inhibitor, antifungal agent, thickening agent, plasticizer, pigment, filler, and antifoaming agent.

When the laminate adhesive contains the above-described additives, it can be added at a timing without particular limitation, and for example, it can be added to one or both of the polyisocyanate component and polyol component, or can be added when the polyisocyanate component and polyol component are blended simultaneously, or can be added separately after blending the polyisocyanate component and polyol component. The ratio of the additive is suitably set in accordance with the type of the additive.

The laminate adhesive of the present invention is prepared, for example, as a two-component curable polyurethane resin.

That is, the laminate adhesive of the present invention is used as follows: the polyisocyanate component (curing agent) and polyol component (main component) are separately prepared, and when in use, the polyisocyanate component (curing agent) and polyol component (main component) are blended and the mixture is applied to an adherend.

The polyisocyanate component (curing agent) and polyol component (main component) are blended so that the equivalent ratio (NCO/OH) of the isocyanate group of the polyisocyanate component (curing agent) relative to the hydroxyl group in the polyol component (main component) is, for example, 0.4 or more, preferably, 0.5 or more, and for example, 10 or less, preferably, 6 or less.

When the laminate adhesive is used as a two-component curable polyurethane resin (that is, two component urethane adhesive), because the polyisocyanate component (curing agent) and the polyol component (main component) are separately prepared, pot life is long, and by blending a least necessary amount of the polyisocyanate component (curing agent) and polyol component (main component) when in use, it can be used as an adhesive with quick curing and excellent adhesion performance.

The above-described laminate adhesive contains a polyisocyanate component and a polyol component, and the polyol component contains polyurethane polyol of a reaction product of polyol and a polyisocyanate derivative with an average functional group of more than 2, and the polyisocyanate derivative is an araliphatic diisocyanate derivative and/or alicyclic diisocyanate derivative. Such polyurethane polyol has a branched structure in its molecule based on the polyisocyanate derivative with an average functional group of more than 2, and therefore has a high crosslinking density and cohesive force. As a result, even if this laminate adhesive is aged for a short period of time, it has excellent adhesive strength, and curing is never be insufficient, and therefore delamination at the time of heating can be suppressed. As a result, the above-described laminate adhesive can be suitably used for an adhesive for producing a laminate film allowing a plurality of films to adhere (attach). To be specific, the above-described laminate adhesive can be suitably used for a laminate adhesive for producing a packing material in various industrial fields such as foods, beverage, medical products, and quasi drugs.

To produce a laminate film using the laminate adhesive, first, a plurality of films are allowed to adhere to each other using the above-described laminate adhesive.

For example, when the curing agent and main component diluted with an organic solvent is used, the curing agent is mixed with the main component, and then a solvent type laminator is used to apply the mixture to the surface of the films, and the solvent is volatilized, and then the surfaces to which the mixture was applied were bonded together, and thereafter, it was aged and cured at a normal temperature (20° C. or more and less than 30° C.).

The amount to be applied is preferably, after the volatilization of the solvent, about 2.0 g/m² or more and 5.0 g/m² or less.

The time for aging is, for example, 12 hours or more, preferably 24 hours or more, and for example, for 4 days or less, preferably for 2 days or less.

When the curing agent and main component without being diluted with an organic solvent is used, the curing agent is blended with the main component, and then using a solventless laminator, the mixture is applied to the surfaces of the films, and the surfaces to which the mixture was applied were bonded, and thereafter, it was aged and cured under the above-described conditions at a normal temperature. The amount applied is, for example, 1.0 g/m² or more and 4.0 g/m² or less.

Examples of the film to be laminated include plastic films such as polyethylene terephthalate, nylon, polyethylene, polypropylene, and polyvinyl chloride; foil of metal such as aluminum; and films of metal such as metal deposited film, silica deposited film, alumina deposited film, silica-alumina composite deposited film, stainless steel, iron, copper, and lead.

These films may be used singly or in combination of two or more. The film can be subjected to a known processing as necessary, such as drawing, corona treatment, and coating.

The film thickness is suitably set in accordance with the types and use.

The laminate adhesive can be cured by being aged at a normal temperature (20° C. or more and less than 30° C.).

As necessary, the laminate adhesive can be aged while being heated (30° C. or more, preferably 40° C. or more, and for example, 80° C. or less, preferably 60° C. or less).

EXAMPLES

The specific numerical values in blending ratio (content ratio), property value, and parameter used in the following description can be replaced with upper limit values (numerical values defined with "or less" or "below") or lower limit values (numerical values defined with "or more" or "above") of corresponding numerical values in blending ratio (content ratio), property value, and parameter described in the above-described "DESCRIPTION OF EMBODIMENTS". The "parts" and "%" are based on mass unless otherwise specified.

1. Preparation of Polyol

Polyol was prepared based on the mixing formulation shown in Table 1.

Synthesis Example 1

665.7 parts by mass of isophthalic acid, 166.4 parts by mass of terephthalic acid, 187.7 parts by mass of adipic acid, 277.9 parts by mass of ethylene glycol, 268.6 parts by mass of neopentyl glycol, 395.9 parts by mass of 1,6-hexanediol, 37.4 parts by mass of dimer acid (manufactured by Croda Japan KK, trade name Pripol 1013 hereinafter the same) and 0.5 parts by mass of zinc acetate were subjected to esterification reaction under nitrogen flow at 180 to 220° C., and predetermined amounts of water and glycol were distilled off, thereby producing polyester polyol having a viscosity measured by a cone plate viscometer of about a 6000 mPa·s (150° C.). The product was cooled to 150° C., and thereafter 9.25 parts by mass of trimellitic anhydride was added, and the mixture was allowed to react for 1 hour. The entire amount was dissolved in 1500.0 parts by mass of ethyl acetate to prepare a solution with a solid content concentration of 57%, thereby producing polyol.

Synthesis Example 2

665.7 parts by mass of isophthalic acid, 166.4 parts by mass of terephthalic acid, 187.7 parts by mass of adipic acid. 277.9 parts by mass of ethylene glycol, 268.6 parts by mass of neopentyl glycol, 395.9 parts by mass of 1,6-hexanediol, 37.4 parts by mass of dimer acid, and 0.5 parts by mass of zinc acetate were subjected to esterification reaction under nitrogen flow at 180 to 220° C., and predetermined amounts of water and glycol were distilled off, thereby producing polyester polyol having a viscosity measured by a cone plate viscometer of about 7000 mPa·s (150° C.). The product was cooled to 150° C., and thereafter 9.25 parts by mass of trimellitic anhydride was added, and the mixture was allowed to react for 1 hour. The entire amount was dissolved in 1500.0 parts by mass of ethyl acetate to prepare a solution with a solid content concentration of 56%, thereby producing polyol.

Synthesis Example 3

678.4 parts by mass of isophthalic acid, 169.6 parts by mass of terephthalic acid, 191.3 parts by mass of adipic acid, 283.2 parts by mass of ethylene glycol, 273.7 parts by mass of neopentyl glycol, 403.4 parts by mass of 1,6-hexanediol, and 0.5 parts by mass of zinc acetate were subjected to esterification reaction under nitrogen flow at 180 to 220° C., and predetermined amounts of water and glycol were distilled off, thereby producing polyester polyol having a viscosity measured by a cone plate viscometer of about 6000 mPa·s (150° C.). The product was cooled to 150° C., and thereafter 9.25 parts by mass of trimellitic anhydride was added, and the mixture was allowed to react for 1 hour. The entire amount was dissolved in 1500.0 parts by mass of ethyl acetate to prepare a solution with a solid content concentration of 57%, thereby producing polyol.

Synthesis Example 4

665.7 parts by mass of isophthalic acid, 166.4 parts by mass of terephthalic acid, 187.7 parts by mass of adipic acid, 277.9 parts by mass of ethylene glycol, 268.6 parts by mass of neopentyl glycol, 395.9 parts by mass of 1,6-hexanediol, 37.4 parts by mass of dimer acid, and 0.5 parts by mass of zinc acetate, 10.0 parts by mass of glycerine were subjected to esterification reaction under nitrogen flow at 180 to 220° C., and predetermined amounts of water and glycol were distilled off, thereby producing polyester polyol having a viscosity measured by a cone plate viscometer of about a 28000 mPa·s (150° C.). The entire amount was dissolved in 1500.0 parts by mass of ethyl acetate to prepare a solution with a solid content concentration of 56%, thereby producing polyol.

Synthesis Example 5

157.2 parts by mass of isophthalic acid, 39.3 parts by mass of terephthalic acid, 40.8 parts by mass of glycerine, 188.7 parts by mass of 1,6-hexanediol were subjected to esterification reaction under nitrogen flow at 180 to 220° C., and predetermined amounts of water and glycol were distilled off, and when the acid number was about 6.4, 271.6 parts by mass of dimer acid was added. Furthermore, when the acid number was about 4.6, 0.1 parts by mass of titanium tetra butoxide was added, thereby producing polyester polyol having an acid number of about 0.8. The product was cooled to 150° C., and thereafter 67.5 parts by mass of trimellitic anhydride was added, and the mixture was allowed to react for 1 hour. The entire amount was dissolved in 300.0 parts by mass of ethyl acetate to prepare a solution with a solid content concentration of 70%, thereby producing polyol.

Synthesis Example 6

488.3 parts by mass of isophthalic acid, 137.7 parts by mass of adipic acid, 203.9 parts by mass of ethylene glycol, 219.0 parts by mass of neopentyl glycol, 290.5 parts by mass of 1,6-hexanediol, and 0.4 parts by mass of zinc acetate were subjected to esterification reaction under nitrogen flow at 180 to 220° C. and predetermined amounts of water and glycol were distilled off, thereby producing polyester polyol having a number average molecular weight of about 5000. The entire amount was dissolved in 800.0 parts by mass of ethyl acetate to prepare a solution with a solid content concentration of 60%, thereby producing polyol.

Synthesis Example 7

488.3 parts by mass of isophthalic acid, 137.7 parts by mass of adipic acid, 203.9 parts by mass of ethylene glycol, 219.0 parts by mass of neopentyl glycol, 290.5 parts by mass of 1,6-hexanediol, and 0.4 parts by mass of zinc acetate were subjected to esterification reaction under nitrogen flow at 180 to 220° C., and predetermined amounts of water and glycol were distilled off, thereby producing polyesterpolyol having a number average molecular weight of about 5000. The product was cooled to 150° C., and thereafter 7.85 parts by mass of trimellitic anhydride was added, and the mixture was allowed to react for 2 hours. The entire amount was dissolved in 805.2 parts by mass of ethyl acetate to prepare a solution with a solid content concentration of 60%, thereby producing polyol.

Synthesis Example 8

To 805.8 parts by mass of polyol of Synthesis Example 6, 16.54 parts by mass of 3-isocyanatomethyl-3,5,5-trimethyl cyclohexyl isocyanate and 0.25 parts by mass of tin octylate were added in a nitrogen atmosphere, and subjected to urethane-forming reaction at 77 to 80° C., for 4 hours. After confirming disappearance of the isocyanate group, 177.66 parts by mass of ethyl acetate was added to prepare a solution with a solid content concentration of 50%, thereby preparing polyol (polyurethane polyol).

2. Preparation of Main Component (Polyol Component)

Based on the mixing formulation shown in Table 2, a main component (polyol component) was prepared.

Synthesis Example 9

To 700.0 parts by mass of polyol of Synthesis Example 1, 13.9 parts by mass of Vestanat T1890/100 (isocyanurate derivative of 3-isocyanatomethyl-3,5,5-trimethyl cyclohexyl isocyanate, solid content concentration: 100 mass %, manufactured by Evonik industries AG) and 0.12 parts by mass of tin octylate were added in a nitrogen atmosphere, and subjected to urethane-forming reaction at 77 to 80'C. After checking the disappearance of the isocyanate group, it was cooled to 50° C., and 0.21 parts by mass of phosphoric acid (manufactured by Wako Pure Chemical Industries, Ltd. hereinafter the same), 0.41 parts by mass of amino silane (manufactured by Shin-Etsu Chemical Co., Ltd., trade name KBM603, hereinafter the same), and 2.05 parts by mass of epoxy silane (manufactured by Shin-Etsu Chemical Co., Ltd., trade name KBM403, hereinafter the same) were mixed. The entire amount mixed with 117.7 parts by mass of ethyl acetate to prepare a solution with a solid content concentration of 50%, thereby preparing a main component.

Synthesis Example 10

To 729.9 parts by mass of polyol in Synthesis Example 2, 14.2 parts by mass of Vestanat T1890/100 and 0.13 parts by mass of tin octylate were added in a nitrogen atmosphere, and subjected to urethane-forming reaction at 77 to 80° C. After checking the disappearance of the isocyanate group, it was cooled to 50° C. and 2.12 parts by mass of epoxy silane was mixed. The entire amount was dissolved in 102.1 parts by mass of ethyl acetate to prepare a solution with a solid content concentration of 50%, thereby preparing a main component.

Synthesis Example 11

To 729.9 parts by mass of polyol of Synthesis Example 2, 18.9 parts by mass of D-131N (TAKENATE D-131N, isocyanurate derivative of xylylene diisocyanate, solid content concentration: 75 mass %, manufactured by Mitsui Chemicals, Inc.) and 0.13 parts by mass of tin octylate were added in a nitrogen atmosphere, and subjected to urethane-forming reaction at 77 to 80° C. After checking the disappearance of the isocyanate group, it was cooled to 50° C., and 2.12 parts by mass of epoxy silane was mixed. Furthermore, 102.1 parts by mass of ethyl acetate were added to prepare a solution with a solid content concentration of 50%, thereby preparing a main component.

Synthesis Example 12

To 729.9 parts by mass of polyol of Synthesis Example 2, 18.9 parts by mass of D-110N (TAKENATE D-110N, trimethylolpropane derivative xylylene diisocyanate (triol derivative), solid content concentration: 75 mass %, manufactured by Mitsui Chemicals, Inc.) and 0.13 parts by mass of tin octylate were added in a nitrogen atmosphere, and subjected to urethane-forming reaction at 77 to 80° C. After checking the disappearance of the isocyanate group, it was cooled to 50° C., and 2.12 parts by mass of epoxy silane was mixed. The entire amount was dissolved in 102.1 parts by mass of ethyl acetate to prepare a solution with a solid content concentration of 50%, thereby preparing a main component.

Synthesis Example 13

To 729. 9 parts by mass of polyol of Synthesis of Example 2, 18.9 parts by mass of D-140N (TAKENATE D-140N, trimethylolpropane derivative (triol derivative) of 3-isocyanatomethyl-3,5,5-trimethyl cyclohexyl isocyanate, solid content concentration: 75 mass %, manufactured by Mitsui Chemicals, Inc.) and 0.13 parts by mass of tin octylate were added in a nitrogen atmosphere, and subjected to urethane-forming reaction at 77 to 80° C. After checking the disappearance of the isocyanate group, it was cooled to 50° C., and 2.12 parts by mass of epoxy silane was mixed. The entire amount was dissolved in 102.1 parts by mass of ethyl acetate to prepare a solution with a solid content concentration of 50%, thereby preparing a main component.

Synthesis Example 14

To 700.0 parts by mass of polyol of Synthesis Example 3, 13.9 parts by mass of Vestanat T1890/100 and 0.12 parts by mass of tin octylate were added in a nitrogen atmosphere, and subjected to urethane-forming reaction at 77 to 80° C. After checking the disappearance of the isocyanate group, it was cooled to 50° C., and 0.21 parts by mass of phosphoric acid, 0.41 parts by mass of amino silane, and 2.05 parts by mass of epoxy silane were mixed. The entire amount was mixed with 117.7 parts by mass of ethyl acetate to prepare a solution with a solid content concentration of 50%, thereby preparing a main component.

Synthesis Example 15

To 729.9 parts by mass of polyol of Synthesis Example 2, 14.2 parts by mass of D-170N (TAKENATE D-170N, isocyanurate derivative of hexamethylene diisocyanate, solid content concentration: 100 mass %, manufactured by Mitsui Chemicals. Inc.) and 0.13 parts by mass of tin octylate were added in a nitrogen atmosphere, and subjected to urethane-forming reaction at 77 to 80'C. After checking the disappearance of the isocyanate group, it was cooled to 50° C., and 2.12 parts by mass of epoxy silane was mixed. The entire amount was dissolved in 102.1 parts by mass of ethyl acetate to prepare a solution with a solid content concentration of 50%, thereby preparing a main component.

Synthesis Example 16

844.8 parts by mass of polyol of Synthesis Example 4, 39.0 parts by mass of polyol of Synthesis Example 5, 2.5 parts by mass of epoxy silane, 113.64 parts by mass of ethyl acetate were mixed to prepare a solution with a solid content concentration of 50%, thereby preparing a main component.

Synthesis Example 17

600.0 parts by mass of polyol of Synthesis Example 8, 333.3 parts by mass of polyol of Synthesis Example 7, 0.15 parts by mass of phosphoric acid, 0.3 parts by mass of amino silane, 4.5 parts by mass of epoxy silane, 71.62 parts by mass of ethyl acetate were mixed to prepare a solution with a solid content concentration of 50%, thereby preparing a main component.

3. Production of Laminate Adhesive

Example 1 to Example LI, and Comparative Example 1 to Comparative Example 3 The polyol component and the polyisocyanate component were blended in accordance with Table 3, thereby producing a laminate adhesive.

4. Evaluation (Peel Strength)

Using the laminate adhesive of Examples and Comparative Examples, a 4-layer-composite film composed of the following was made: polyethylene terephthalate film (thickness 12 μm)/nylon film (thickness 15 μm: corona treatment on both surfaces)/aluminum foil (thickness 9 μm)/unstretched poly propylene film (thickness 60 μm: corona treatment on both surfaces).

That is, a laminate adhesive (blend of curing agent and main component) was applied on one side of a polyethylene terephthalate film under normal temperature, and then an organic solvent was volatilized. Then, one side (applied surface) was bonded to the other side of a nylon film, and a 2-layer-composite film was made.

Then, to one side of the nylon film of the 2-layer-composite film, the laminate adhesive was applied, and the organic solvent was volatilized. Then, one side (applied surface) was bonded to the other side of aluminum foil, and a 3-layer-composite film was made. Then, to one side of the aluminum foil of the 3-layer-composite film, the laminate adhesive was applied, and the solvent was volatilized. Then, one side (applied surface) was bonded to the other side of the unstretched poly propylene film.

In the above-described bonding steps, the laminate adhesive (blend of curing agent and main component) was further diluted with ethyl acetate suitably so that the amount applied was about 3.3 g/m² after the solvent was volatilized.

Thereafter, the obtained 4-layer-composite film was aged under conditions of 24° C. (no heating) and for 2 days, thereby curing the laminate adhesive. In this manner, a laminate film was produced.

A portion of the laminate film was put into a heat sealer, and heat sealed under conditions of 220° C.

The obtained laminate film was measured for peel strength between nylon film/aluminum foil (NY/AL) and Peel Strength (HS strength) at the heat seal portion in accordance with JIS K 6854-3 (1999) with a width of 15 mm and a tensile speed of 300 min/min. The measurement was conducted under conditions of 24° C. (strength under normal temperature) and 120° C. thermostatic chamber (strength under heat).

Table 3 shows the result.

The heat seal portion of the obtained laminate film was Observed visually, and heat seal resistance was evaluated.

Evaluation was made based on criteria below.

Good: no delamination was seen.

Mediocre: delamination occurred at a portion of the heat seal portion.

Bad: delamination occurred at many portions of the heat seal portion.

(Nonheat Aging Retorting Test)

The obtained laminate film was used to make a bag having a size of 13×17.5 cm (seal width 5 to 10 mm), and charged with 130 g of a content of vinegar/salad oil/ketchup at a volume ratio of 1/1/1.

The bag opening was put on a heat sealer, and heat sealed under conditions of 220° C.

The bag was placed on a tray of 210×520×105 mm, and sterilized with hot water at 135° C. for 30 minutes, with turning every minutes for 8 times, under pressure of 0.35 MPa.

Then, peel strength between nylon film/aluminum foil (NY/AL) and at the heat seal portion (HS strength) after the hot water sterilization were measured in accordance with JIS K 6854-3(1999) under 24° C. with a width of 15 mm and a tensile speed of 300 mm/min. Appearance after the hot water sterilization test was evaluated visually. Table 3 shows the result.

Appearance was evaluated based on criteria below.

Good: no delamination was seen.

Mediocre: delamination occurred at a portion of the heat seal portion.

Bad: delamination occurred at many portions of the heat seal portion.

TABLE 1

| | | Synthesis Example No. | Synthesis Example 1 | Synthesis Example 2 | Synthesis Example 3 | Synthesis Example 4 | Synthesis Example 5 | Synthesis Example 6 | Synthesis Example 7 | Synthesis Example 8 |
|---|---|---|---|---|---|---|---|---|---|---|
| Polyol (polyester polyol) | Low molecular-weight polyol | Ethylene glycol | 277.9 | 277.9 | 283.2 | 277.9 | — | 203.9 | 203.9 | Polyurethane polyol was prepared |
| | | Neopentyl glycol | 268.6 | 268.6 | 273.7 | 268.6 | — | 219.0 | 219.0 | |
| | | 1,6-Hexanediol | 395.9 | 395.9 | 403.4 | 395.9 | 188.7 | 290.5 | 290.5 | |
| | | Glycerine | — | — | — | 10.0 | 40.8 | — | — | |
| | Polybasic acid | Isophthalic acid | 665.7 | 665.7 | 678.4 | 665.7 | 157.2 | 488.3 | 488.3 | |
| | | Terephthalic acid | 166.4 | 166.4 | 169.6 | 166.4 | 39.3 | — | — | |
| | | Adipic acid | 187.7 | 187.7 | 191.3 | 187.7 | — | 137.7 | 137.7 | |
| | | Dimer acid | 37.4 | 37.4 | — | 37.4 | 271.6 | — | — | |
| | Esterification catalyst | Zinc acetate | 0.5 | 0.5 | 0.5 | 0.5 | — | 0.4 | 0.4 | |
| | | Titanium tetra butoxide | — | — | — | — | 0.1 | — | — | |
| | Acid anhydride | Trimellitic anhydride | 9.25 | 9.25 | 9.25 | — | 67.5 | — | 7.85 | |

TABLE 2

| Synthesis Example No. | | | Synthesis Ex. 9 | Synthesis Ex 10 | Synthesis Ex. 11 | Synthesis Ex. 12 | Synthesis Ex. 13 | Synthesis Ex. 14 | Synthesis Ex. 15 | Synthesis Ex. 16 | Synthesis Ex. 17 |
|---|---|---|---|---|---|---|---|---|---|---|---|
| Polyol component | Polyol | Polyol of Synthesis Ex. 1 | 700.0 | — | — | — | — | — | — | — | — |
| | | Polyol of Synthesis Ex. 2 | — | 729.9 | 729.9 | 729.9 | 729.9 | — | 729.9 | — | — |
| | | Polyol of Synthesis Ex. 3 | — | — | — | — | — | 700.0 | — | — | — |
| | | Polyol of Synthesis Ex. 4 | — | — | — | — | — | — | — | 844.8 | — |
| | | Polyol of Synthesis Ex. 5 | — | — | — | — | — | — | — | 39.0 | — |
| | | Polyol of Synthesis Ex. 6 | — | — | — | — | — | — | — | — | — |
| | | Polyol of Synthesis Ex. 7 | — | — | — | — | — | — | — | — | 333.3 |
| | | Polyol of Synthesis Ex. 8 | — | — | — | — | — | — | — | — | 600.0 |
| | Polyiso-cyanate derivative with an average functions group of more than 2 | Vestanat T1890/100 | 13.9 | 14.2 | — | — | — | 13.9 | — | — | — |
| | | D-131N | — | — | 18.9 | — | — | — | — | — | — |
| | | D-140N | — | — | — | — | 18.9 | — | — | — | — |
| | | D-110N | — | — | — | 18.9 | — | — | — | — | — |
| | | D-170N | — | — | — | — | — | — | 14.2 | — | — |
| | Urethane-forming catalyst | Tin octylate | 0.12 | 0.13 | 0.13 | 0.13 | 0.13 | 0.12 | 0.13 | — | — |
| | Silane coupling agent | Amino silane | 0.41 | — | — | — | — | 0.41 | — | — | 0.3 |
| | | Epoxy silane | 2.05 | 2.12 | 2.12 | 2.12 | 2.12 | 2.05 | 2.12 | 2.5 | 4.5 |
| | Oxyacid of phosphorus | Phosphoric acid | 0.21 | — | — | — | — | 0.21 | — | — | 0.15 |

TABLE 3

| | Example•Comparative Example No. | | Ex. 1 | Ex. 2 | Ex. 3 | Ex. 4 | Ex. 5 | Ex. 6 | Ex. 7 | Ex. 8 |
|---|---|---|---|---|---|---|---|---|---|---|
| Laminate adhesive | Polyol component (main component) | Polyol component Polyol and polyisocyanate derivative with an average functional group of more than 2 | Synthesis Ex. 9 IPDI iso cyanurate derivative | Synthesis Ex. 9 IPDI iso cyanurate derivative | Synthesis Ex. 9 IPDI iso cyanurate derivative | Synthesis Ex. 9 IPDI iso cyanurate derivative | Synthesis Ex. 9 IPDI iso cyanurate derivative | Synthesis Ex. 9 IPDI iso cyanurate derivative | Synthesis Ex. 10 IPDI iso cyanurate derivative | Synthesis Ex. 11 IPDI iso cyanurate derivative |
| | Polyisocyanate component (curing agent) | Type | XDI triol derivative/XDI iso cyanurate derivative (7/3) | XDI triol derivative/XDI iso cyanurate derivative (9/1) | XDI triol derivative/XDI iso cyanurate derivative (8/2) | XDI triol derivative/XDI iso cyanurate derivative (6/4) | XDI triol derivative/XDI iso cyanurate derivative (5/5) | XDI triol derivative | XDI iso cyanurate derivative | XDI iso cyanurate derivative |
| | | Ratio of triol derivative of xylylene diisocyanate relative to isocyanurate derivative of xylylene diisocyanate | 2.3 | 9 | 4 | 1.5 | 1 | — | — | — |

TABLE 3-continued

| | | | | | | | | | | |
|---|---|---|---|---|---|---|---|---|---|---|
| | Blending ratio of main component/curing agent | | 15/1 | 15/1 | 15/1 | 15/1 | 15/1 | 18/1 | 18/1 | 18/1 |
| Evaluation | Heat seal resistance | | Good | Good | Good | Good | Good | Good | Good | Good |
| | Normal temperature strength | NY/AL | 3.9 | 3.5 | 3.6 | 3.3 | 3.2 | 3.8 | 3.1 | 3.0 |
| | | HS strength | 59 | 54 | 55 | 54 | 53 | 58 | 52 | 51 |
| | Strength under heat | NY/AL | 1.8 | 1.6 | 1.7 | 1.7 | 1.6 | 1.6 | 1.5 | 1.4 |
| | After retorting | Appearance | Good | Mediocre | Good | Good | Good | Mediocre | Good | Good |
| | | NY/AL | 5.4 | 5.2 | 5.3 | 4.6 | 4.4 | 5.4 | 4.2 | 4.0 |
| | | HS strength | 52 | 48 | 49 | 51 | 50 | 40 | 47 | 46 |

| | | | Example• Comparative Example No. | Ex. 9 | Ex. 10 | Ex. 11 | Comp. Ex. 1 | Comp. Ex. 2 | Comp. Ex. 3 |
|---|---|---|---|---|---|---|---|---|---|
| Laminate adhesive | Polyol component (main component) | Polyol component | Polyol and polyisocyanate derivative with an average functional group of more than 2 | Synthesis Ex. 12 XDI iso cyanurate derivative | Synthesis Ex. 13 XDI iso cyanurate derivative | Synthesis Ex. 14 XDI iso cyanurate derivative | Synthesis Ex. 15 (HDI iso cyanurate derivative) | Synthesis Ex. 16 (Glycerine) | Synthesis Ex. 17 (IPDI) |
| | Polyisocyanate component (curing agent) | Type | | XDI iso cyanurate derivative | XDI iso cyanurate derivative | XDI triol derivative/ XDI iso cyanurate derivative (7/3) | XDI iso cyanurate derivative | XDI iso cyanurate derivative | XDI iso cyanurate derivative |
| | | Ratio of triol derivative of xylylene diisocyanate relative to isocyanurate derivative of xylylene diisocyanate | | — | — | 2.3 | — | — | — |
| | Blending ratio of main component/curing agent | | | 18/1 | 18/1 | 15/1 | 18/1 | 13/1 | 13/1 |
| Evaluation | Heat seal resistance | | | Good | Good | Good | Good | Good | Bad |
| | Normal temperature strength | NY/AL | | 3.5 | 3.7 | 3.3 | 3.1 | 2.7 | — |
| | | HS strength | | 53 | 50 | 52 | 48 | 46 | — |
| | Strength under heat | NY/AL | | 1.6 | 1.6 | 1.1 | 1.5 | 1.6 | — |
| | After retorting | Appearance | | Mediocre | Mediocre | Mediocre | Bad | Bad | — |
| | | NY/AL | | 3.8 | 3.7 | 4.6 | 2.4 | 1.6 | — |
| | | HS strength | | 47 | 48 | 47 | 35 | 33 | — |

Abbreviations in Tables are described below.

T1890: Vestanat T1890/100, isocyanurate derivative of 3-isocyanatomethyl-3,5,5-trimethyl cyclohexyl isocyanate, solid content concentration: 100 mass %, manufactured by Evonik Degussa Japan D-131N: TAKENATE D-131N, isocyanurate derivative of xylylene diisocyanate, solid content concentration: 75 mass %, manufactured by Mitsui Chemicals, Inc.

D-110N: TAKENATE D-110N, trimethylolpropane derivative of xylylene diisocyanate (triol derivative), solid content concentration: 75 mass %, manufactured by Mitsui Chemicals, Inc.

D-140N: TAKENATE D-140N, trimethylolpropane derivative (triol derivative) of 3-isocyanatomethyl-3,5, 5-trimethyl cyclohexyl isocyanate, solid content concentration: 75 mass %, manufactured by Mitsui Chemicals, Inc.

D-170N: TAKENATE D-170N, isocyanurate derivative of hexamethylene diisocyanate, solid content concentration: 100 mass %, manufactured by Mitsui Chemicals, Inc.

AL: aluminum foil

NY: nylon film

The films used in the above-described tests were described below.

Polyethylene terephthalate film: ester film ES102 manufactured by TOYOBO CO., LTD, Nylon film: Emblem ONBC manufactured by UNITIKA LTD., corona treatment on both surfaces Aluminum foil: aluminum foil C manufactured by TOYO ALUMINIUM K.K.

Unstretched poly propylene film: Torayfan NO ZK207, manufactured by TORAY ADVANCED FILM CO., LTD., corona treatment on both surfaces While the illustrative embodiments of the present invention are provided in the above description, such is for illustrative purpose only and it is not to be construed as limiting in any manner. Modifications and variations of the present invention that will be obvious to those skilled in the art are to be covered by the following claims.

INDUSTRIAL APPLICABILITY

The laminate adhesive of the present invention is suitably for laminate processing of a laminate film.

The invention claimed is:

1. A laminate adhesive comprising:
   a polyisocyanate component and a polyol component,
   wherein the polyol component contains polyurethane polyol of a reaction product of polyol and a polyisocyanate derivative with an average functional group of more than 2, the polyurethane polyol has a hydroxyl group at its terminal, and
   the polyisocyanate derivative is an araliphatic diisocyanate derivative and/or alicyclic diisocyanate derivative.

2. The laminate adhesive according to claim 1, wherein the polyisocyanate derivative is an isocyanurate derivative of araliphatic diisocyanate and/or isocyanurate derivative of alicyclic diisocyanate.

3. The laminate adhesive according to claim 1, wherein the polyisocyanate derivative is an isocyanurate derivative of 3-isocyanatomethyl-3,5,5-trimethyl cyclohexyl isocyanate.

4. The laminate adhesive according to claim 1, wherein the polyisocyanate component is an isocyanurate derivative of xylylene diisocyanate and/or triol derivative of xylylene diisocyanate.

5. The laminate adhesive according to claim 1, wherein the polyisocyanate component contains an isocyanurate derivative of xylylene diisocyanate and a triol derivative of xylylene diisocyanate.

6. The laminate adhesive according to claim 5, wherein the ratio of the content of the triol derivative of xylylene diisocyanate relative to the content of the isocyanurate derivative of xylylene diisocyanate is 1.5 or more and 4 or less.

7. The laminate adhesive according to claim 1, wherein the polyol is a reaction product of a low molecular-weight polyol and polybasic acid, and
   the polybasic acid contains dimer acid.

* * * * *